United States Patent [19]
Scherzer et al.

[11] Patent Number: 6,007,752
[45] Date of Patent: *Dec. 28, 1999

[54] PRODUCTION OF SHEET-LIKE POLYURETHANE MOLDINGS

[75] Inventors: Dietrich Scherzer, Neustadt; Ludwig Jung, Mammendorf; Bernd Bruchmann, Freinsheim; Hans Renz, Meckenheim, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,106

[22] Filed: May 5, 1997

[30] Foreign Application Priority Data

May 8, 1996 [DE] Germany .................. 196 18 390

[51] Int. Cl.⁶ .................. B29C 67/00; C08G 18/10; C08G 18/32
[52] U.S. Cl. .................. 264/136; 264/321; 264/324; 528/45; 528/48; 528/55; 528/67; 528/73
[58] Field of Search .................. 264/136, 321, 264/324; 528/45, 48, 55, 67, 73

[56] References Cited

U.S. PATENT DOCUMENTS

| | | |
|---|---|---|
| 4,204,051 | 5/1980 | Wellner et al. . |
| 4,786,655 | 11/1988 | Grögler et al. . |
| 4,812,368 | 3/1989 | Scherzer et al. . |
| 4,894,429 | 1/1990 | Grögler et al. . |
| 5,548,057 | 8/1996 | Hirayama et al. . |

FOREIGN PATENT DOCUMENTS

| | | |
|---|---|---|
| 269 943 A2 | 6/1988 | European Pat. Off. . |
| 640 634 A2 | 3/1995 | European Pat. Off. . |
| 669 353 A1 | 8/1995 | European Pat. Off. . |
| 752 433 A2 | 1/1997 | European Pat. Off. . |
| 1088534 | 10/1967 | United Kingdom . |

*Primary Examiner*—Leo B. Tentoni
*Attorney, Agent, or Firm*—Fernando A. Borrego

[57] ABSTRACT

Sheet-like polyurethane moldings are produced by impregnation of porous sheets with a prepolymer containing free isocyanate groups and reversibly blocked isocyanate-reactive groups or containing free isocyanate-reactive groups and reversibly blocked isocyanate groups, and subsequent reaction of the prepolymers in a heated mold.

11 Claims, No Drawings

PRODUCTION OF SHEET-LIKE POLYURETHANE MOLDINGS

FIELD OF THE INVENTION

The invention relates to a process for producing sheet-like polyurethane moldings by impregnation of porous, sheet-like materials with prepolymers and a subsequent reaction of the prepolymers to give polyurethanes.

BACKGROUND OF THE INVENTION

Sheet-like polyurethane moldings are used, in particular, for interior trim of vehicles. They can be produced by impregnation of porous, sheet-like materials with polyurethane systems and the subsequent reaction of these systems to give polyurethanes. Polyurethane systems which can be used are isocyanates, for example in the form of dispersions, or prepolymers containing isocyanate groups, the isocyanate groups then reacting with water. Atmospheric moisture and/or the moisture present in the porous, sheet-like materials may be sufficient for this reaction. The porous, sheet-like materials are customarily first introduced into the mold and there impregnated with the premixed polyurethane system.

Porous, sheet-like materials which can be used here are synthetic foams such as flexible or semirigid polyurethane foams, or fabrics such as glass wool or fabrics of natural fibers such as felts or plant fibers.

For molding and for accelerating the reaction, the sheets are usually placed in a heated mold after impregnation. During this process step the moldings can also ba provided with laminating materials such as films or mats. This gives moldings having a sandwich structure.

The known processes for producing sheet-like polyurethane moldings have disadvantages. When dissolved isocyanates are used, solvents are given off. To overcome this deficiency it is proposed in EP-A-276 465 that aqueous isocyanate suspensions be used for impregnating the porous materials. However, this process results in relatively long demolding times since evaporation of the water takes a long time.

When using polyurethane systems for producing sheet-like moldings, it is necessary for the systems to have a sufficiently long pot life in order to avoid the foaming prior to complete impregnation of the porous material. The viscosity of such polyurethane systems is usually very high. As a result, particularly when using sheet-like materials based on plant fibers, impregnation with the polyurethane systems can be incomplete. Flow problems occur when impregnating the materials in the mold.

It is an object of the present invention to develop a simple and inexpensive process for producing sheet-like polyurethane moldings which avoids the disadvantages of the prior art.

SUMMARY OF THE INVENTION

We have found that this object is achieved by a process for producing sheet-like polyurethane moldings by impregnation of a porous sheet with a polyurethane formative component and its subsequent reaction to give the polyurethane with simultaneous molding in a heatable mold, wherein the polyurethane formative component used is a prepolymer containing terminal isocyanate groups and reversibly blocked isocyanate-reactive groups or containing free isocyanate-reactive groups and reversibly blocked isocyanate groups.

The present invention accordingly provides a process for producing sheet-like polyurethane moldings by impregnation of a porous sheet with a polyurethane formative component and its subsequent reaction to give the polyurethane with simultaneous molding in a heatable mold, wherein the polyurethane formative component used is a prepolymer containing free isocyanate groups and reversibly blocked isocyanate-reactive groups or containing free isocyanate-reactive groups and reversibly blocked isocyanate groups.

DETAILED DESCRIPTION

The isocyanate-reactive groups are groups having Zerewitinoff hydrogen atoms, in particular hydroxyl groups and primary or secondary amino groups.

The prepolymers containing free isocyanate groups and reversibly blocked hydroxyl groups which are used according to the present invention can be obtained by reacting at least difunctional isocyanates with at least difunctional alcohols in which at least one hydroxyl group is reversibly blocked. In this reaction the free hydroxyl groups react with the isocyanate groups. When the hydroxyl groups of the prepolymers thus obtained are unblocked, the prepolymer hydroxyl groups which are set free react with the isocyanate groups of the prepolymers to give polyurethane.

The blocking agents for the hydroxyl groups are advantageously selected such that the blocking is reversed on application of heat and steam, as occurs in the molding of the sheet-like moldings. Blocking of the hydroxyl groups by reaction with ketones, in particular acetone, has been found to be particularly advantageous. Since, in this reaction, two adjacent hydroxyl groups react with a ketone, alcohols having a functionality of at least three and at least two adjacent hydroxyl groups are necessary. Preferred representatives are triols, in particular glycerol and trimethylolpropane (TMP).

The reaction of the triols with acetone proceeds very smoothy. The reaction is illustrated schematically for the example of the reaction of glycerol with acetone.

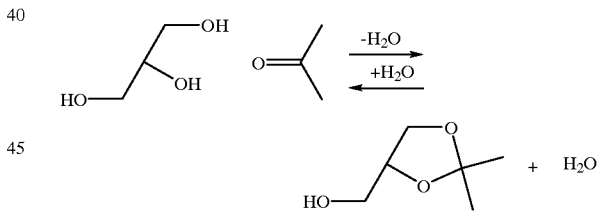

The triol blocked in this way reacts with the isocyanate like a monool. The isopropylidine group can be reconverted into two hydroxyl groups, with elimination of acetone, by treatment with water and heat, these two hydroxyl groups then reacting with the free isocyanate groups of the prepolymer. The decomposition of the isopropylidene group can be accelerated by addition of Lewis or Brönstedt acids. It is particularly advantageous to set the ratio of blocked polyol groups to free isocyanate groups in the prepolymer such that a stoichiometric reaction occurs.

The prepolymers used according to the present invention have a virtually unlimited shelf life. They are very simple to handle. The acetone liberated in the case of the compounds which are preferably used does not, owing to its small amount, represent any hazard or have any adverse effect on the process.

Isocyanate components which can be used are the known and customary isocyanates such as tolylene diisocyanate, monomeric diphenylmethane diisocyanate or polymeric diphenylmethane diisocyanate. Owing to the higher cross linking, preference is given to using polymeric diphenylmethane diisocyanate, known as raw MDI, for preparing the polyurethane components of the present invention.

The prepolymers containing free isocyanate groups and reversibly blocked amino groups which are used according to the present invention can be prepared by analogous reaction mechanisms. The reversible blocking of the amino groups is preferably carried out by reaction with aldehydes or ketones.

It is of course also possible to use products containing terminal hydroxyl groups and reversibly blocked isocyanate groups for the process of the present invention. The reversible blocking of the isocyanate groups can, for example, be carried out by formation of uretdione groups.

To accelerate the reaction between the isocyanate and hydroxyl groups, customary urethane-formation catalysts such as tertiary amines or organic metal compounds, in particular dimethylhexylamine, triethylenediamine, dibutyltin dilaurate and lead dioctoate, can be added to the prepolymer. These become active only after unblocking and do not impair the storage stability of the prepolymers.

The sheet-like polyurethane moldings can be provided with covering layers (laminating layers). This is usually achieved by laying the laminating layers into the mold prior to introduction of the impregnated sheets. It is also possible to only partially impregnate the porous sheet or introduce an impregnated layer into the mold together with unimpregnated layers.

The following details may be given regarding the starting materials for the process of the present invention:

Porous sheets which can be used are both synthetic products and natural materials. Among the synthetic products, flexible and semirigid foams, in particular polyurethane foams, are of particular importance. To ensure sufficient impregnation, a high content of open cells is necessary. These requirements are met, in particular, by polyurethane foams.

Fiberglass mats can also be used as porous sheets. Fiberglass mats customarily used have a weight per unit area of about 500 g/m$^3$.

Sheets of natural fibers have achieved greatly increased importance in recent times. In particular, mats of plant fibers such as flax, sisal or jute can be advantageously used. When such products are used, the process of the present invention is particularly advantageous compared with those of the prior art, since these mats have a high flow resistance toward the polyurethane components. This often results, when using polyurethane systems, in the polyurethane system not being able to fully penetrate the mats before the reaction commences, giving inhomogeneities in the moldings obtained.

Impregnation of the porous sheet can be carried out either manually, for example using brushes or hand rollers, or mechanically, for example by spraying on or using calenders.

After impregnation, the sheets are placed in heatable molds. There the blocking is reversed and the polyurethane reaction occurs. The temperature in the molds is 80–130° C., preferably 90–120° C. The porous sheet can be cut to size for molding either before or after impregnation. To obtain better demoldability, mold release agents are used. It is here possible to use either internal mold release agents or to spray the mold with release agent prior to introducing the sheet.

It is also possible, and for many applications customary, to provide the sheet-like polyurethane moldings with laminating layers. Laminating layers which can be used are, for example, open-celled and closed-celled foams, fiber mats, fabrics, plastic films and similar materials. The laminating layers can be applied to one side or to both sides of the sheet-like polyurethane moldings. The laminating layer is usually applied by first placing the laminating material and then the impregnated sheet-like material in the mold and then forming the polyurethane by heating. This results in bonding of the laminating material and the formation of a sandwich structure. It may here be possible, particularly when using films as laminating material, to dispense with the use of mold release agents.

The sheet-like moldings produced by the process of the present invention have a homogeneous structure, good strength and a uniform surface.

EXAMPLES

Example 1

Preparation of a 1-component Polyurethane System from Isopropylideneglycerol and Raw MDI In a heated stirred reactor, 24.4 kg of isopropylideneglycerol were added over a period of 1 hour to 75.6 kg of raw MDI Lupranat® M20W (BASF).

During this procedure, the temperature was maintained at 80° C. After a further hour, the reaction mixture was cooled. The NCO content was 15.6% by weight.

The isopropylideneglycerol is commercially available. It can also be easily prepared by reaction of glycerol and acetone.

Example 2

Production of a Sheet-like Molding

A flax-sisal mat having a weight per unit area of 1000 g/m$^2$ was introduced into a heated test plate mold having dimensions of 500×200×2 mm and impregnated with 450 g of the prepolymer from Example 1. The impregnation was carried out by means of a hand roller. The impregnated mat was then sprayed with water and left in the mold and pressed for 5 minutes. The mold temperature was 120° C. The part was then removed from the mold.

The part had excellent mechanical properties and a very smooth surface.

Example 3

Production of a Sheet-like Molding

The procedure of Example 2 was repeated, except that the mat was impregnatated with a mixture of 400 g of the prepolymer from Example 1 and 50 g of a prepolymer of 4,4'-MDI and polypropylene glycol having an NCO content of 23% by weight and pressed. The old temperature was 130° C. After 3 minutes, the part was removed from the mold. The part had excellent mechanical properties and a very smooth surface.

We claim:

1. A process for producing a sheet-like polyurethane molding comprising impregnating a porous sheet with a polyurethane formative component and reacting said polyurethane formative component in a heatable mold to produce the molding, wherein the polyurethane formative component comprises a prepolymer containing free isocyanate groups and reversibly blocked isocyanate-reactive groups, wherein said isocyanate-reactive groups are hydroxyl groups blocked by reaction with ketones.

2. A process as claimed in claim 1, wherein the hydroxyl groups are blocked by means of acetone.

3. A process as claimed in claim 1, wherein the free isocyanate groups are present in a stoichiometric ratio to the reversibly blocked isocyanate-reactive groups.

4. A process as claimed in claim 1, wherein the reaction of the prepolymers to give polyurethanes is carried out in the presence of urethane-formation catalysts.

5. A process as claimed in claim 1, wherein the prepolymers are used together with other polyurethane precursors.

6. A process for producing a sheet-like polyurethane molding, the method comprising the steps of:

(a) providing a polyurethane formative component;

(b) disposing a porous sheet in a heatable mold;

(c) impregnating said porous sheet with and reacting said polyurethane formative component in said mold; and (d) allowing said polyurethane formative component to cure, thereby producing the molding;

wherein said polyurethane formative component comprises a prepolymer containing free isocyanate groups and reversibly blocked isocyanate-reactive groups, wherein said isocyanate-reactive groups are hydroxyl groups blocked by reaction with ketones.

7. A process as claimed in claim 6, wherein said hydroxyl groups are blocked by means of acetone.

8. A process as claimed in claim 6, wherein the free isocyanate groups are present at a stoichiometric ratio to said reversibly blocked or isocyanate-reactive groups.

9. A process as claimed in claim 6, wherein the reaction of said prepolymer giving polyurethanes is carried out in the presence of urethane-formation catalysts.

10. A process as claimed in claim 6, wherein said prepolymer is used together with other polyurethane precursors.

11. A process for producing a sheet-like polyurethane molding, the method comprising the steps of:

(a) providing a prepolymer polyurethane formative component;

(b) disposing a porous sheet in a heatable mold;

(c) impregnating said porous sheet with and reacting said polyurethane formative component in said mold; and (d) allowing said polyurethane formative component to cure, thereby producing the molding;

wherein said polyurethane formative component comprises a prepolymer containing free isocyanate groups and reversibly blocked isocyanate-reactive groups at a stoichiometric ratio to each other, wherein said isocyanate-reactive groups are hydroxyl groups blocked by reaction with acetones.

* * * * *